(12) United States Patent
Aktas et al.

(10) Patent No.: US 7,672,418 B2
(45) Date of Patent: Mar. 2, 2010

(54) CONTROL ROD GUIDE TUBE AND METHOD FOR PROVIDING COOLANT TO A NUCLEAR REACTOR FUEL ASSEMBLY

(75) Inventors: Birol Aktas, Wilmington, NC (US); Carlton W. Clark, Wlimington, NC (US); William Earl Russell, II, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 241 days.

(21) Appl. No.: 11/644,485

(22) Filed: Dec. 22, 2006

(65) Prior Publication Data

US 2008/0152068 A1 Jun. 26, 2008

(51) Int. Cl.
*G21C 7/06* (2006.01)
(52) U.S. Cl. .................. 376/239; 376/230; 376/353; 376/362
(58) Field of Classification Search .................. 376/239, 376/230, 353, 362
See application file for complete search history.

(56) References Cited

U.S. PATENT DOCUMENTS

| | | | |
|---|---|---|---|
| 3,650,895 A * | 3/1972 | Sodergard | .................. 376/353 |
| 4,904,443 A | 2/1990 | Carruth | |
| 5,241,570 A | 8/1993 | Challberg | |
| 5,267,286 A * | 11/1993 | Hirukawa | .................. 376/353 |
| 5,329,563 A | 7/1994 | Baversten | |
| 5,513,233 A * | 4/1996 | Hidaka et al. | ................ 376/352 |
| 6,418,178 B1 | 7/2002 | Kobsa | |
| 6,556,641 B2 * | 4/2003 | Maehara et al. | ............. 376/260 |
| 2006/0096026 A1 | 5/2006 | Lutz | |

* cited by examiner

*Primary Examiner*—Rick Palabrica
(74) *Attorney, Agent, or Firm*—Harness, Dickey & Pierce, P.L.C.

(57) ABSTRACT

Control rod guide tubes for a nuclear reactor having a body with an axial length that defines a lower end portion and an upper end portion and a cavity within a substantial length of the body. Orifices are included at the upper and lower end portions of the body. A control rod chamber is located within the cavity and is configured for receiving a control rod. A plurality of ports is coupled to the cavity and is positioned at a substantial length from the upper end portion of the body. Also included are at least two flow channels within the cavity that extend a substantial portion of the axial length of the body. Each flow channel is fluidly coupled to one or more of the ports for receiving fluid flow from outside the body and an outlet proximate to the upper end portion of the body for providing the received fluid flow.

21 Claims, 4 Drawing Sheets

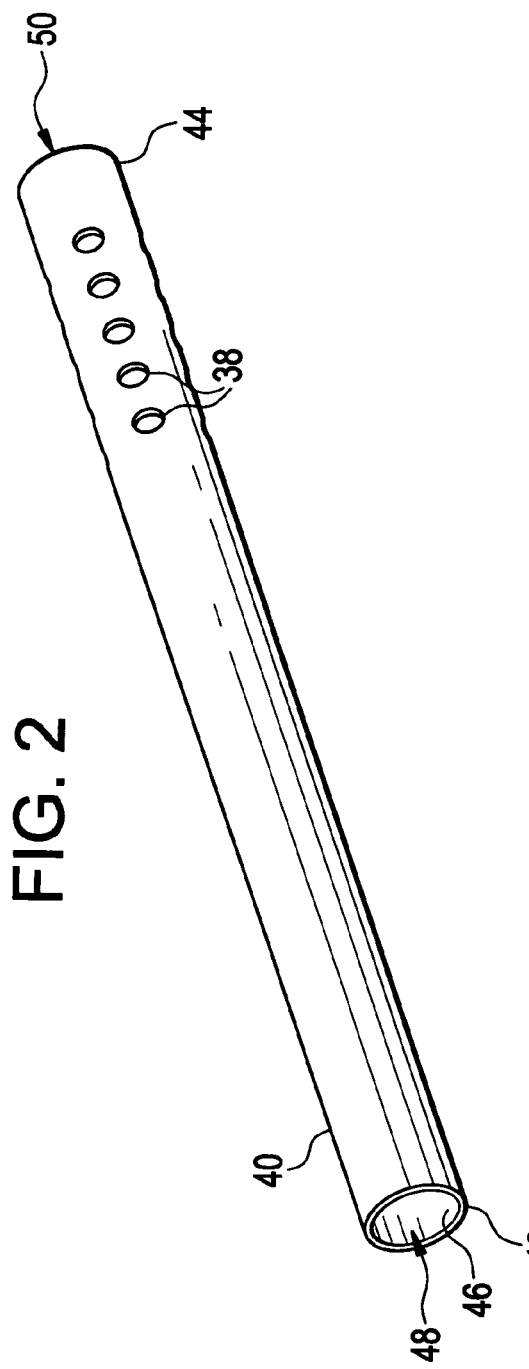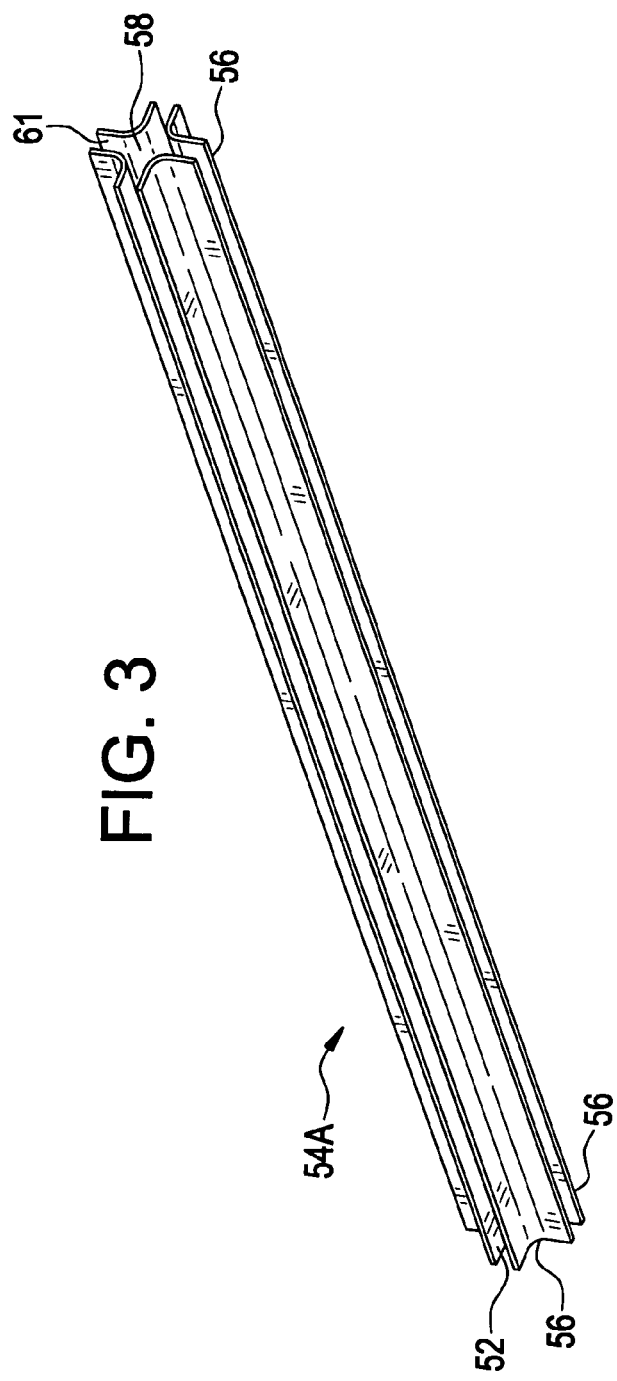

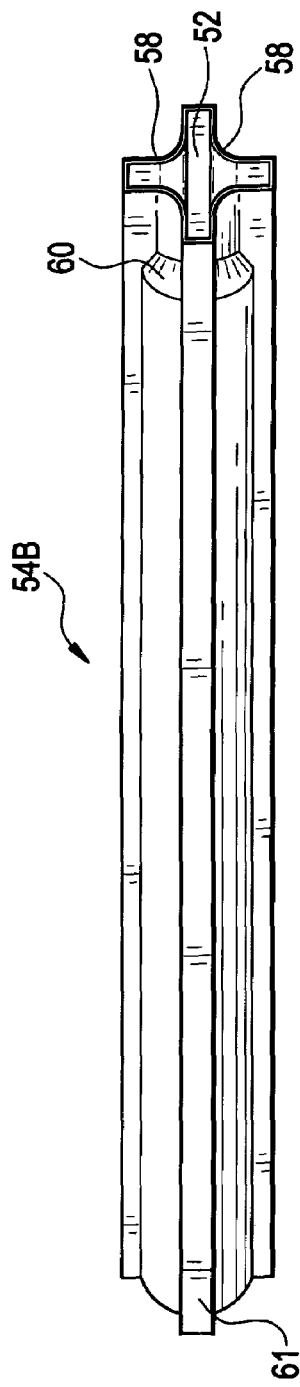
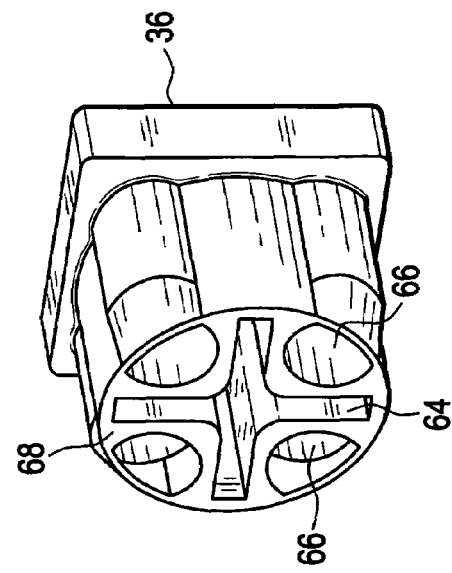
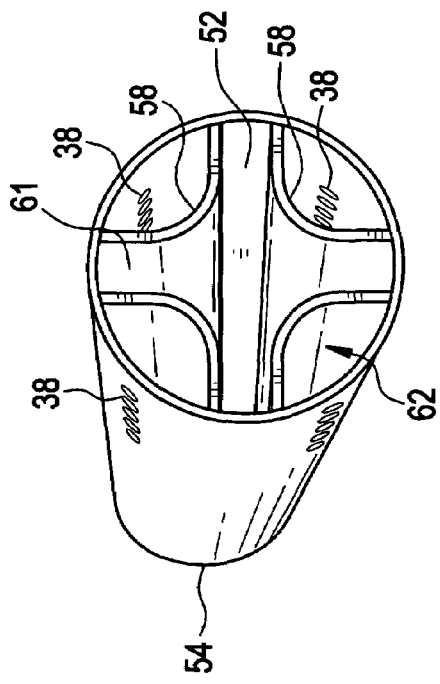

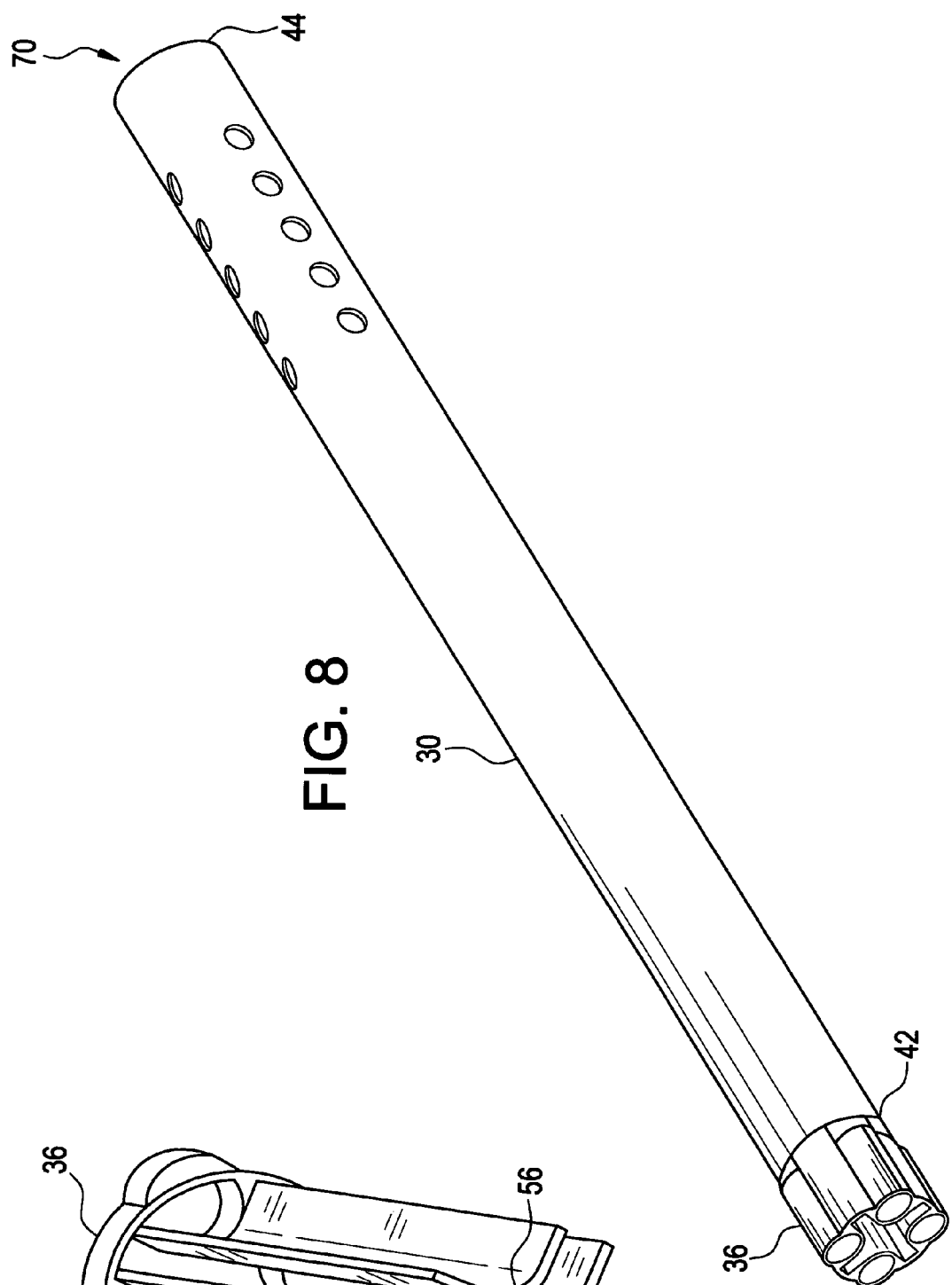

CONTROL ROD GUIDE TUBE AND METHOD FOR PROVIDING COOLANT TO A NUCLEAR REACTOR FUEL ASSEMBLY

FIELD

The present disclosure relates to nuclear reactors and, more specifically, control rod guide tubes for supporting control rods extracted from the reactor core and for channeling coolant flow to fuel supports and fuel assemblies in a reactor core.

BACKGROUND

The statements in this section merely provide background information related to the present disclosure and may not constitute prior art.

A nuclear reactor pressure vessel (RPV) has a generally cylindrical shape and is closed at both ends, e.g., by a bottom head and a removable top head. A top guide is spaced above a core plate within the RPV. A core shroud, or shroud, surrounds the core plate and is supported by a shroud support structure. Particularly, the shroud has a generally cylindrical shape and surrounds both the core plate and the top guide. The top guide includes several openings, and fuel assemblies are inserted through the openings and are supported by the core plate. The core plate includes a flat plate supported by a plurality of beams.

A nuclear reactor core includes a plurality of individual fuel assemblies that have different characteristics that affect the strategy for operation of the core. For example, a nuclear reactor core typically has several hundred individual fuel assemblies that have different characteristics; each fuel assembly includes a plurality of fuel rods. The fuel assemblies are arranged within the reactor core so that the interaction between the fuel assemblies satisfies regulatory and reactor design guidelines and constraints. In addition the core arrangement determines the cycle energy, which is the amount of energy that the reactor core generates before the core needs to be refreshed with new fuel elements, the core loading arrangement preferably optimizes the core cycle energy.

A core cycle is determined from one periodic reactor core refueling to a second reactor core refueling. During the course of the cycle of operation, the excess reactivity, which defines the energy capability of the core, is controlled in two ways. Specifically, a burnable poison, e.g., gadolinia, is incorporated in the fresh fuel. The quantity of initial burnable poison is determined by design constraints typically set by the utility and by the National Regulatory Commission (NRC). The burnable poison controls most, but not all, of the excess reactivity. A second way is through the manipulation of control rods within the core. Control rods control the excess reactivity. Specifically, the reactor core contains control rods which assure safe shutdown and provide the primary mechanism for controlling the maximum power peaking factor. The total number of control rods available varies with core size and geometry, and is typically between 50 and 269. The position of the control rods, i.e., fully inserted, fully withdrawn, or somewhere between, is based on the need to control the excess reactivity and to meet other operational constraints, such as the maximum core power peaking factor.

Coolant is introduced in the core to cool the core and to be transitioned into steam as a working fluid for energy generation. Normal coolant flow enters the fuel assemblies as a single phased flow with slightly sub-cooled coolant from the fuel support. The flow goes vertically upward around the control rod guide tubes, and then turns horizontally as the flow enters a side inlet to a fuel support supporting a fuel assembly. The flow then turns ninety degree within the fuel support and upward until it passes through an orifice of the fuel support to provide a pressure drop to assist coolant distribution to the fuel assemblies. The flow then turns vertical and enters a lumen on the lower tie plate of the fuel assembly and is distributed around the individual fuel rods of the fuel assembly.

Known reactors have included fuel support orifice regions within the core, one around the peripheral and one near the center. The peripheral region includes all fuel locations around the periphery of the core, and the center region includes the remainder of the locations. The fuel support orifices are designed to limit the fluid flow to the fuel assemblies in the peripheral region to about half of the fluid flow per fuel element of the center region. Limiting the peripheral flow by this magnitude has permitted the very low power peripheral fuel elements to saturate the coolant flow, but with maintaining the exit quality and average voids that are still much lower than for the other higher power region. This uneven exit quality and average void can produce inefficient steam separation and nuclear moderation.

It is also known that the coolant flow can be adjusted through varying the design of the fuel assembly. For example, it is known that each fuel assembly can include a main coolant flow channel and inlet that has a substantial constant flow. However, the fuel assemblies can also include one or more secondary coolant flow channels that can vary to adjust the coolant flow in the particular fuel assemblies. In some cases, three types of fuel assemblies can provide three different secondary coolant flows. Each such fuel assembly can be positioned in the core to provide for a desired coolant flow. For example, the three different fuel assemblies can be arranged into three or more core regions. The flow of coolant through each fuel assembly in each region can be different from the coolant flow through a fuel assembly in each other region based on the position of the three different fuel assemblies. However, this requires the manufacture of three different fuel assemblies and/or tie plates.

In the known reactor arrangements, the fluid flow into the fuel support and then into the lower tie plate of the fuel assemblies is asymmetrical and unstable.

SUMMARY

The inventors hereof have succeeded at designing control rod guide tubes that can enable an improved symmetrical and/or stable fluid flow into the fuel support and then into the fuel assembly. Additionally, the inventors hereof have designed a reactor core fluid flow assembly and methods for providing coolant into fuel assemblies having a reduced pressure drop associated with the providing of the fluid flow to the fuel support and, therefore, to fuel assemblies.

According to one aspect, a control rod guide tube for a nuclear reactor includes a body having an axial length defining a lower end portion and an upper end portion and a cavity within a substantial length of the body including orifices at the upper and lower end portions of the body. A control rod chamber located within the cavity is configured for receiving a control rod. A plurality of ports is coupled to the cavity and is positioned at a substantial length from the upper end portion of the body. Also included are at least two flow channels within the cavity extending a substantial portion of the axial length of the body. Each flow channel is fluidly coupled to one or more of the ports for receiving fluid flow from outside the body and an outlet proximate to the upper end portion of the body for providing the received fluid flow.

According to another aspect, a control rod guide tube for a nuclear reactor includes a body having a cylindrical wall defining an upper end portion, a lower end portion, a cavity defined by an interior surface of the wall and extending from the upper end portion to the lower end portion, and a plurality of ports positioned axially along the wall between the upper end portion and the lower end portion for providing fluid flow into the body cavity. Also included is an insert dimensioned for positioning within the body cavity and having an upper end portion and a lower end portion and including a control rod chamber adapted for receiving a control rod and a plurality of channel fixtures that, at least partially, define one or more flow channels within the cavity of the body. The flow channels are configured for receiving a fluid flow through one or more of the body ports, channeling the received fluid flow within the body cavity between the lower end portion and the upper end portion, and providing the fluid flow to the upper end portion of the body.

According to yet another aspect, a control rod guide tube for a nuclear reactor includes means for receiving a control rod, and means for channeling a substantially symmetrical fluid flow into a lower orifice of a fuel assembly cavity of a fuel support.

According to still another aspect, a method of stabilizing fluid flows to fuel assemblies within a nuclear reactor includes enclosing a control rod chamber within a cavity of a body of a control rod guide tube. The control rod chamber is adapted for receiving a control rod. A plurality of axial flow channels are positioned within the body cavity of the control rod guide tube. The method also includes coupling the body to a fuel support that has a plurality of fuel assembly cavities adapted for providing the fluid flows to the fuel assemblies. The coupling includes fluidly mating each of the axial flow channels to a corresponding fuel assembly cavity.

According to another aspect, a method of flow control management in a nuclear reactor includes receiving a fluid flow into a flow channel of a control rod guide tube through one or more ports defined by the control rod guide tube, providing the received fluid flow from the flow channel to a cavity of a fuel support, providing the fluid flow from the fuel support cavity to a lumen on a lower tie plate of a fuel assembly.

Further aspects of the present invention will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 2 is a side perspective view of a control rod guide tube body according to one exemplary embodiment.

FIG. 3 is a side perspective view of a multi-component insert having four insert fixtures according to one exemplary embodiment of a control rod guide tube.

FIG. 4 is a side perspective view of a monolithic insert according to another exemplary embodiment of a control rod guide tube.

FIG. 5 is an end perspective view of a control rod guide tube according to one exemplary embodiment.

FIG. 6 is a bottom perspective view of a fuel support suitable for coupling to some control rod guide tube embodiments of the present disclosure.

FIG. 7 is a bottom view of a partially disassembled control rod guide tube with a coupled fuel support illustrating alignment of the control rod guide tube insert with the fuel support according to one exemplary embodiment.

FIG. 8 is a side perspective view of an assembly including one exemplary control rod guide tube, a coupled fuel support and an affixed coupling fixture according to one exemplary embodiment.

It should be understood that throughout the drawings, corresponding reference numerals indicate like or corresponding parts and features.

DETAILED DESCRIPTION

Figure 1:
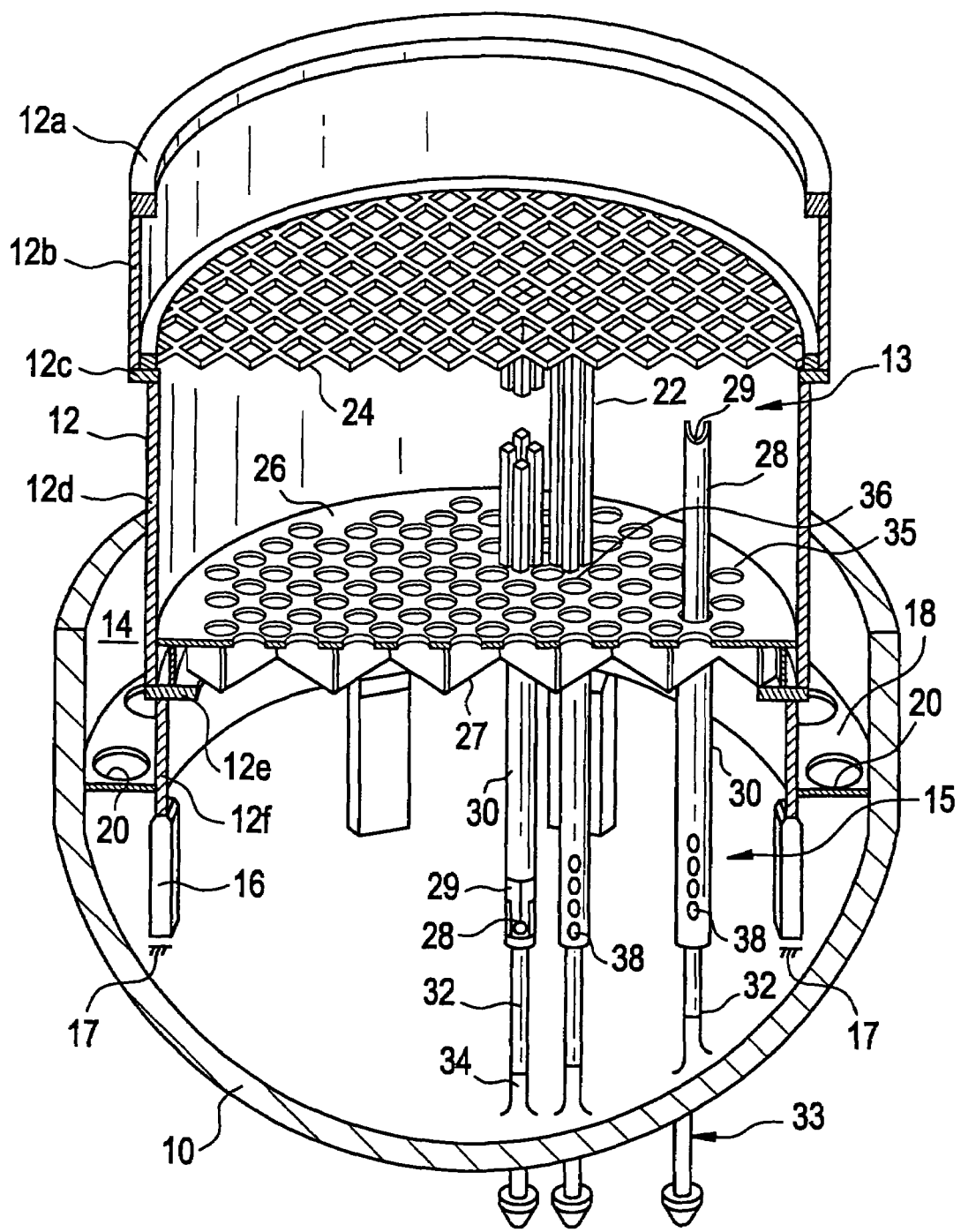
FIG. 1 is a cutaway side view of a nuclear reactor operating environment suitable for some exemplary embodiments.

The following description is merely exemplary in nature and is not intended to limit the present disclosure or the disclosure's applications or uses.

In some embodiments, a control rod guide tube for a nuclear reactor includes a body having an axial length defining a lower end portion and an upper end portion and a cavity within a substantial length of the body including orifices at the upper and lower end portions of the body. A control rod chamber located within the cavity is configured for receiving a control rod. A plurality of ports is coupled to the cavity and is positioned at a substantial length from the upper end portion of the body. Also included are at least two flow channels within the cavity extending a substantial portion of the axial length of the body. Each flow channel is fluidly coupled to one or more of the ports for receiving fluid flow from outside the body and an outlet proximate to the upper end portion of the body for providing the received fluid flow. This can be better understood with reference to the figures.

As seen by way of the exemplary operating environment of FIG. 1, a conventional boiling water reactor (BWR) has a reactor pressure vessel 10 and a core shroud 12 arranged concentrically in the reactor pressure vessel 10 with an annular region, namely, the downcomer annulus 14, therebetween. The core shroud 12 is a stainless steel cylinder surrounding the nuclear fuel core 13. In particular, the core shroud 12 comprises a shroud head flange 12a for supporting the shroud head (not shown); a circular cylindrical upper shroud wall 12b having a top end welded to shroud head flange 12a; an annular top guide support ring 12c welded to the bottom end of upper shroud wall 12b; a circular cylindrical middle shroud wall 12d that is a welded assembly welded to the top guide support ring 12c; and an annular core plate support ring 12e welded to the bottom of the middle shroud wall 12d and to the top of a lower shroud wall 12f. As seen in FIG. 1, the shroud 12 is vertically supported by a plurality of shroud support legs 16, each of the latter being welded to the bottom head 17 of the reactor pressure vessel 10. The core shroud 12 is laterally supported by an annular shroud support plate 18, which is welded at its inner diameter to the core shroud 12 and at its outer diameter to the reactor pressure vessel 10. The shroud support plate 18 has a plurality of circular apertures 20 in flow communication with diffusers of a plurality of jet pump assemblies (not shown), The fuel core 13 of a BWR consists of a multiplicity of upright and parallel fuel assemblies 22 (also referred to as fuel bundles) arranged in arrays, each fuel assembly 22 includes an array of fuel rods inside a fuel channel made of zirconium-based alloy. Each array of fuel bundle assemblies is supported at the top by a top guide 24 and at the bottom by a core plate 26 and its underlying support structure 27. The core plate 26 subdivides the reactor into the fuel core 13 and a lower plenum 15. The core top guide 24 provides lateral support for the top of the fuel assemblies 22 and the core plate 26 provides lateral support for the bottom of the fuel assemblies 22. This lateral support maintains the correct fuel channel spacing in each array to permit vertical travel of a control rod 28 including a plurality of control rod blades 29 between the fuel assemblies 22.

The power level of the reactor is maintained or adjusted by positioning the control rods 28 up and down within the core 13 while the fuel assemblies 22 are held stationary. Each control rod 28 has a cruciform cross-section consisting of four wings or control rod blades 29 at right angles. Each control rod blade 29 consists of a multiplicity of parallel tubes welded in a row with each tube containing stacked capsules filled with neutron-absorbing material. Each control rod 28 is raised or lowered with the support of a control rod guide tube 30 by an associated control rod drive (33) which can be releasably coupled by a spud at its top to a socket in the bottom of the control rod 28.

The control rod drives 33 are used to position control rods 28 in a BWR to control the fission rate and fission density, and to provide adequate excess negative reactivity to shutdown the reactor from any normal operating or accident condition at the most reactive time in core life. Each control rod drive 33 is mounted vertically in a control rod drive housing 32 which is welded to a stub tube 34, which in turn is welded to the bottom head 17 of the reactor pressure vessel 10. The control rod drive 33 is a double-acting, mechanically latched hydraulic cylinder. The control rod drive 33 is capable of inserting or withdrawing a control rod (28) at a slow controlled rate for normal reactor operation and of providing rapid control rod 28 insertion (scram) in the event of an emergency requiring rapid shutdown of the reactor.

The control rod drive housing 32 has an upper flange that bolts to a lower flange of the control rod guide tube 30. Each control rod guide tube 30 sits on top of and is vertically supported by its associated control rod drive housing 32. The uppermost portion of the control rod guide tube 30 penetrates a corresponding circular aperture in the core plate 26. There can be more than 140 control rod guide tubes 30 penetrating an equal number of circular apertures 35 in the core plate 26, each aperture 35 has a diameter slightly greater than the outer diameter of the control rod guide tube 30.

The control rod drive housings 32 and control rod guide tubes 30 have two functions: (1) to house the control rod drive 33 mechanisms and the control rods 28, respectively, and (2) to support the weight of the fuel in the fuel assemblies 22. The fuel weight is reacted at an orifice of a fuel support 36 that is positioned on the top of the control rod guide tube 30. The control rod guide tubes 30 and housings 32 act as columns carrying the weight of the fuel.

During operation of the reactor, water in the lower plenum 15 enters ports 38 of the control rod guide tube 30. The water is channeled within the control rod guide tube 30 to the orifice of the fuel support 36 and into a lumen of a lower tie plate of the fuel assemblies 22. The water continues to rise in the fuel assemblies 22 and in the fuel core 13, with a substantial amount turning to steam, which is used in the production of electrical energy.

As illustrated by the exemplary embodiments if FIGS. 2-5, the control rod guide tube 30 has a body 40 with an axial length defining an upper end portion 42 and a lower end portion 44 and a cavity 46 within a substantial length of the body 40. An orifice 48 at the upper end portion 42 and orifice 50 at the lower end portion 44 of the body 40. The upper end portion 42 can be adapted for coupling to a bottom of a fuel support 36 for fluidly coupling a flow channel to a bottom orifice of the fuel support 36 and to a fuel assembly 22 engaged with or positioned on top of the fuel support 36. The lower end portion 44 can be adapted for coupling to a control rod drive housing 32 for supporting the control rod guide tube 30 within the lower plenum 15 and in alignment with the control rod drive 33. This can include a coupling fixture (shown in FIG. 6) that can be attached to the lower end portion of the body 40 for releasably coupling the control rod guide tube 30.

A control rod chamber 52 (as shown in FIGS. 3, 4, and 5, by way of examples) is located within the cavity 46. The control rod chamber 52 is adapted, configured and/or dimensioned for receiving the control rod 28. As the control rod 28 generally has a cruciform shape, the control rod chamber 52 can also have a corresponding cruciform shape. The control rod chamber 52 can be defined, at least in part, within the cavity 46 by one or more structures, referred herein generally as an insert 54. The insert can be have monolithic body or can be a grouping of one or more insert components that together form the insert 54 and that define, at least in part, the control rod chamber 52 within the cavity 46.

One example of a multiple component insert 54A is illustrated, by way of example, in FIG. 3. In this embodiment, the insert 54A includes four insert flow fixtures 56 each having a curved-shaped that when assembled with their convex portions back-to-back define a cruciform-shaped control rod chamber 52. Additionally, each insert flow fixture 56 defines a portion of a flow channel 58 by its convex shape. In some embodiments, each pair of insert flow fixtures 56 (also referred herein as channel fixtures) are coupled at an outer periphery forming a hollow arm 61 defining a portion of the control rod chamber 52 configured for receiving a control rod blade 29 of the control rod 30.

An example embodiment of a monolithic body for an insert 54B is illustrated in FIG. 4. In this embodiment, the cruciform-shaped control rod chamber 52 is fully enclosed at the ends of each blade 29. Flow channels 58 are also provided along an external convex surface of this embodiment of insert 54B. Optionally, one or more control rod inlets 60 can provide for a flow of coolant into the control rod chamber 52 and therefore about the control rod 28 and its control rod blades 29 contained with the control rod chamber 52.

The ports 38 are coupled to the cavity 46 and are positioned at a substantial length from the upper end portion 42 of the body 40. Generally, a substantial length as described herein includes a length of the total substantial body length such that the flow from the ports 38 to the upper end portion 42 within the cavity 46 becomes stable or is otherwise generally symmetrical, or lacking significant amounts of asymmetries or turbulence. The substantial length can be proximate to the lower end portion 44 as illustrated in FIG. 2, or can be at any distance greater than near or proximate to the upper end portion 42. As such, a substantial length can include any length greater than a minor length and is not intended to be indicated of requiring a majority or more of the total length of the body 40.

Additionally, while FIGS. 2 and 5 illustrate five ports 38 positioned along four sides of the body 40, more or less ports are possible and still within the scope of this disclosure. Additionally, the cross-sectional area of the ports 38 can vary, as well as the number of ports axially aligned along the body 40.

As noted, the control rod guide tube 30 includes at least two flow channels 58 within the cavity 46. In some embodiments, the flow channels 58 are defined in part by the insert 54 and in part by an interior surface of the body 40. Generally, in some embodiments, the flow channels 58 extend a substantial portion of the axial length of the body 40. Each flow channel 58 is fluidly coupled to one or more ports 38 for receiving fluid flow from the lower plenum 15 and an outlet 62 proximate to and/or defined by the upper end portion 42 of the body 40. The outlet 62 provides the fluid flow to an orifice of a coupled fuel support 36. Generally, in some embodiments, the cross-sectional area of each flow channel 58 is about equal to or less than a cross-sectional area of the coupled fuel assembly orifice (not shown). In one embodiment, a plurality of ports 38 are coupled to a flow channel 58 and the combined cross-sectional area of the coupled ports 38 is greater than a cross-sectional area of the coupled flow channel 58. In this manner, flow from the lower plenum 15 into the flow channel 58 is not restricted at the ports 38 and turbulence can be reduced.

It should be noted that in some embodiments, the insert 54 can be fixed in position relative to the body 40. For example, the insert flow fixture 56 of insert 54A can be welded or otherwise affixed within the cavity 46 such as to an inner surface defining the cavity 46. This can include fixedly attaching the insert 54 to an inner surface such that each flow channel 58 is substantially enclosed by a portion of the inner surface and the insert 54, to reduce any turbulence that can be caused or related to a non-enclosed or open or unattached portion of the insert 54 and the inner surface.

Additionally, the monolithic insert 54B can also be affixed within the cavity 46 of the body 40. In other embodiments, the insert 54 can be rotatable within the cavity 46. Having a rotatable insert 54 can provide for, among others, for rotating a control rod 38 within the control rod guide tube 30 during a refueling operation without having to remove the control rod 38 and/or the control rod guide tube 30.

Referring now to FIG. 6, one embodiment of a fuel support 36 is illustrated from a bottom perspective. As shown, generally the fuel support 36 also includes a cruciform chamber for allowing passage of the control rod 28 into the fuel core 13. The fuel support 36 includes a plurality of orifices 66 for receiving the flow from the flow channels 38 of the control rod guide tube 30. The lower end portion 68 of the fuel support 36 is adapted for coupling to the upper end portion 42 of the body 40. This can include by welding or any other suitable method of attachment. As shown in FIG. 7, the fuel support 36 and the control rod guide tube 30 are coupled to align the flow channel 58 with the orifices 66. As shown, the insert flow fixtures 56 are aligned to define a flow channel 58 that provides a fluid flow into each orifice 66. As noted above, the cross-sectional area of the flow channels 58 can be about equal to or less than the cross-sectional area of the coupled orifice 66. In such embodiments, little to no pressure increase occurs at the point of interface between the flow channel 58 and the orifice 66. In some embodiments, the comparative cross-sectional areas can provide for a pressure drop at this interface.

FIG. 8 illustrates one embodiment of a control rod guide tube 30 assembled with a fuel support 36 affixed to the upper end portion 42 and a coupling fixture 70 affixed to the lower end portion 44.

According to other embodiments, a method of stabilizing fluid flows to fuel assemblies within a nuclear reactor includes enclosing a control rod chamber within a cavity of a body of a control rod guide tube wherein the control rod chamber is adapted for receiving a control rod. The method also includes defining a plurality of axial flow channels within the body cavity of the control rod guide tube. The method further includes coupling the body to a fuel support having a plurality of fuel assembly cavities adapted for providing the fluid flows to the fuel assemblies. The coupling includes fluidly mating each of the axial flow channels to a corresponding fuel assembly cavity.

This can include providing one or more ports on the body for each axial flow channel and/or defining axial flow channels to have a cross-sectional area less than or equal to a fluidly-mated fuel assembly cavity.

In another operational embodiment, a method of flow control management in a nuclear reactor includes receiving a fluid flow into a flow channel of a control rod guide tube through one or more ports defined by the control rod guide tube. The method also includes providing the received fluid flow from the flow channel to a cavity of a fuel support, providing the fluid flow from the fuel support cavity to a lumen on a lower tie plate of a fuel assembly. Generally, this can include receiving the fluid flow from one or more of the ports for reducing flow asymmetries within the flow channel and flow asymmetries as provided from the flow channels to an orifice of the fuel assembly coupled thereto.

In some embodiments, the method can also include providing a fluid flow from a flow channel to the fuel support orifice or cavity such that the provided fluid flow does not experience or result in an increase (and in some embodiments within a substantial increase) in fluid pressure as provided by control rod guide tube. This can be an improvement from fluid flows provided by the traditional inlets on the sides of the fuel support. In this exemplary manner, a fuel support or other fluid handling portions of the reactor can be modified to take advantage of the reduction in the fluid pressure provided by the control rod guide tube as described by the various embodiments of this disclosure.

This can include, in some embodiments, reducing a pressure drop of the fluid flow across the control rod guide tube as provided herein and increasing a pressure drop of the fluid flow across the fuel support and the lower tie plate as a result of the reduction in the inlet fluid flow as provided by the control rod guide tube as compared to the side inlet of the fuel support. Further operational benefits for a reactor can be provided by configuring or modifying the fuel support or an orifice or cavity thereof to further modify the fluid flow to the fuel assembly.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A control rod guide tube for a nuclear reactor, comprising:
    a body having an axial length defining a lower end portion and an upper end portion;
    a cavity within a substantial length of the body including one or more orifices at the upper and lower end portions of the body;

a control rod chamber within the cavity for receiving a control rod;

a plurality of ports coupled to the cavity and positioned at a substantial length from the upper end portion of the body; and at least two flow channels within the cavity extending a substantial portion of the axial length of the body;

wherein each flow channel is fluidly coupled to one or more of the ports for receiving fluid flow from outside the body, and wherein each flow channel is fluidly coupled to an outlet proximate to the upper end portion of the body for providing the received fluid flow.

2. The control rod guide tube of claim 1, wherein the control rod chamber has a cruciform shape.

3. The control rod guide tube of claim 1, wherein the upper end portion of the body is configured to couple to a bottom of a fuel support for fluidly coupling each of the flow channels to an orifice of a fuel assembly cavity defined by the fuel support.

4. The control rod guide tube of claim 3, wherein a cross-sectional area of each flow channel is about equal to or less than a cross-sectional area of the orifice of the fuel assembly cavity.

5. The control rod guide tube of claim 1, wherein a combined cross-sectional area of the ports coupled to each flow channel is greater than a cross-sectional area of the coupled flow channel.

6. The control rod guide tube of claim 1, further comprising:

an insert positioned within the cavity;

wherein the insert defines the control rod chamber within the cavity, and wherein the insert defines each of the flow channels in conjunction with an inner surface of the body defining the cavity.

7. The control rod guide tube of claim 6, wherein the insert is rotatable within the cavity.

8. The control rod guide tube of claim 6, wherein the insert is fixedly attached to the inner surface of the body.

9. A control rod guide tube for a nuclear reactor, comprising:

a body having a wall defining an upper end portion, a lower end portion, a cavity defined by an interior surface of the wall and extending from the upper end portion to the lower end portion, and a plurality of ports positioned axially along the wall between the upper end portion and the lower end portion for providing fluid flow into the cavity; and an insert dimensioned for positioning within the cavity and the insert having an upper end portion and a lower end portion and including a control rod chamber configured to receive a control rod and a plurality of channel fixtures that, at least partially, define one or more flow channels within the body cavity for receiving a fluid flow through one or more of the body ports, for channeling the received fluid flow within the body cavity between the lower end portion and the upper end portion, and for providing the fluid flow to the upper end portion of the body.

10. The control rod guide tube of claim 9, wherein the upper end portion of the body is configured to couple to a bottom of a fuel support, and wherein the upper end portion of the body is configured to fluidly couple each of the flow channels to an orifice of a fuel assembly cavity defined by the fuel support.

11. The control rod guide tube of claim 10, wherein one or more flow channel fixtures and portions of the interior surface of the wall define each of the flow channels within the body cavity, wherein each flow channel extends substantially from the lower end portion to the upper end portion, and wherein each flow channel has a cross-sectional area about equal to or less than a cross-sectional area of the orifice of the fuel support cavity.

12. The control rod guide tube of claim 9, wherein each flow channel is configured to receive fluid flow from two or more ports.

13. The control rod guide tube of claim 12, wherein a combined cross-sectional area of the ports of each flow channel is greater than a cross-sectional area of the flow channel.

14. The control rod guide tube of claim 9, wherein each of the ports are positioned at a distance from the upper end portion in order to establish a substantially symmetrical fluid flow to the upper end portion of each flow channel.

15. The control rod guide tube of claim 9, wherein the insert is fixedly attached to an inner surface of the wall defining the cavity, and wherein each flow channel is substantially enclosed by a portion of the inner surface and a portion of the insert.

16. The control rod guide tube of claim 15, wherein the insert includes a hole between one of the flow channels and the control rod chamber, and wherein the hole is dimensioned and positioned to enable a portion of the fluid flow to enter the control rod chamber.

17. The control rod guide tube of claim 9, wherein the insert is rotatable within the body cavity.

18. The control rod guide tube of claim 9, further comprising:

a coupling fixture attached to the lower end portion of the body configured to releasably couple the control rod guide tube within the reactor.

19. The control rod guide tube of claim 9, wherein each pair of channel fixtures is coupled at an outer periphery forming a hollow arm defining a portion of the control rod chamber.

20. The control rod guide tube of claim 19, wherein the channel fixtures define the control rod chamber having a cruciform shape.

21. A control rod guide tube for a nuclear reactor, comprising:

means for receiving a control rod; and means for channeling a substantially symmetrical fluid flow into a lower orifice of a fuel assembly cavity of a fuel support;

wherein the means for channeling includes at least two flow channels within a body of the control rod guide tube that extend a substantial portion of an axial length of the body, and wherein fluid flow in a first channel of the at least two flow channels is substantially parallel to fluid flow in a second channel of the at least two flow channels.

* * * * *